(12) United States Patent
Mejia et al.

(10) Patent No.: US 7,471,615 B2
(45) Date of Patent: Dec. 30, 2008

(54) STORAGE DEVICE HAVING INFORMATION TO IDENTIFY DEFECTIVE STORAGE REGION

(75) Inventors: Robert G. Mejia, Boise, ID (US); Mauricio Huerta Alva, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 852 days.

(21) Appl. No.: 10/903,175

(22) Filed: Jul. 30, 2004

(65) Prior Publication Data

US 2006/0023613 A1    Feb. 2, 2006

(51) Int. Cl.
*G11B 9/00* (2006.01)
*G11B 27/36* (2006.01)

(52) U.S. Cl. .............. 369/126; 369/47.14; 369/53.17

(58) Field of Classification Search ............. 369/47.14, 369/53.17, 53.16, 126
See application file for complete search history.

(56) References Cited

U.S. PATENT DOCUMENTS

| 4,926,272 | A | * | 5/1990 | Takamatsu et al. ............ 360/49 |
| 5,394,388 | A | * | 2/1995 | Hatanaka et al. ............ 369/126 |
| 5,453,970 | A | * | 9/1995 | Rust et al. .................... 369/126 |
| 5,557,596 | A | | 9/1996 | Gibson et al. |
| 5,848,077 | A | * | 12/1998 | Kamae et al. ................ 714/807 |
| 6,275,410 | B1 | | 8/2001 | Morford |
| 7,155,640 | B2 | * | 12/2006 | Nam ........................... 714/42 |
| 2005/0174275 | A1 | * | 8/2005 | Goossens et al. ............ 341/143 |

* cited by examiner

*Primary Examiner*—Thang V Tran

(57) ABSTRACT

A storage device includes a storage medium and a probe to read from and write to the storage medium. The storage medium has a plurality of storage regions, where each storage region contains information to identify whether another storage region is defective.

23 Claims, 9 Drawing Sheets

STORAGE DEVICE HAVING INFORMATION TO IDENTIFY DEFECTIVE STORAGE REGION

BACKGROUND

Modern electronic products, including computers, consumer products such as digital cameras, digital video recorders and the like, and other products employ high-capacity storage devices to achieve high performance. Atomic resolution storage (ARS) technology represents an attractive option for satisfying the demand for storage in such products.

An ARS storage device typically includes electron field emitters that are arranged to write data to, or read data from, a large number of storage locations on a storage medium. The field emitters, sometimes alternatively referred to as "point emitters" or "probes," are configured with sharp tips.

During operation of an ARS storage device, a predetermined potential difference is applied between a field emitter and a corresponding gate. An electron beam current is emitted from the sharp tip of the field emitter toward the surface of a storage medium. Writing data from a field emitter to a storage location on the storage medium is accomplished by temporarily increasing the power density of the electron beam current. The electron beam current with increased power density modifies the structural state of the surface of the storage medium that corresponds to the target storage location. Reading data from the storage location may be accomplished by observing the effect on the storage location that results from bombardment by an electron beam.

Another type of ARS storage device includes contact-based scanning probes that are used to read from and write to a storage medium. Each scanning probe has a tip that contacts the surface of the storage medium. Storage of data is based on perturbations (such as dents) created by the probe tip in the surface of the storage medium.

Defects in the storage medium of an ARS storage device can lead to read errors. Storage devices typically have some type of a failure recovery mechanism to recover certain types of read errors. Conventionally, in response to detecting a defective storage region, the failure recovery mechanism accesses predetermined information, such as information in a look-up table, to identify the location of a spare storage region storing data for defective storage regions. Once the spare storage region is identified, the probe of the ARS storage device is moved to the spare storage region. The process of detecting a defective storage region, identifying a spare storage region for the defective storage region, and moving the probe from the defective storage region to the spare storage region is relatively time consuming. Thus, whenever a defective storage region is encountered, an access time penalty is incurred, which slows down storage access.

DETAILED DESCRIPTION

Figure 1:
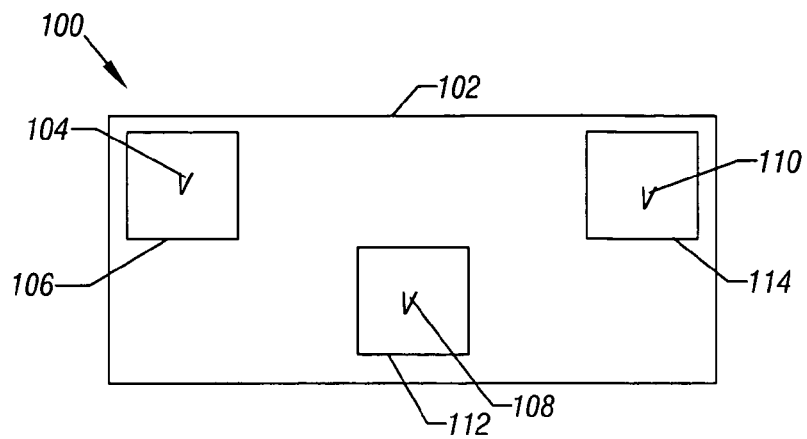
FIG. 1 is a pictorial representation of a portion of a storage module that includes storage regions that may be scanned by probes.

FIG. 1 depicts a generalized representation of a portion of a storage module 100. The storage module 100 includes a storage medium 102 that interacts with probes 104, 108, 110. Each probe is able to write data to and read data from a respective storage region 106, 112, or 114 on the storage medium 102. In one implementation, each storage region 106, 112, or 114 is referred to as a "patch." Because a patch may typically be much smaller than the entire area of the storage medium 102, the storage medium may include numerous probes and associated patches.

A number of patches (e.g., 65), may be organized into a data "cluster." An appropriate number of clusters (e.g., 24) make up the storage module 100. In some implementations, multiple storage modules 100 can be combined to form a storage device or subsystem. Note that the specific numbers of patches and clusters mentioned above are exemplary. Other implementations can employ different numbers of patches in a cluster and different numbers of clusters in a storage module. Also, in alternative embodiments, a storage module does not have to be arranged in patches and clusters, but rather can be divided into other forms of storage regions.

In one implementation, each probe 104, 108, 110 of the storage module 100 includes a field emitter that generates electron beams emitted to storage locations on the storage medium 102 for performing reads and writes. Alternatively, each probe 104, 108, 110 can be a contact-based probe that forms perturbations, such as dents, in the storage medium 100 for representing data. The contact-based probe is heatable to an elevated temperature to soften a surface region of the storage medium 102 to enable formation of a dent. Field emitter and contact-based probes are both examples of probes formed with nanotechnology techniques. The probes (referred to as "nanotechnology" probes) are microscopic in size, usually on the order of micrometers or nanometers.

Figure 2A:
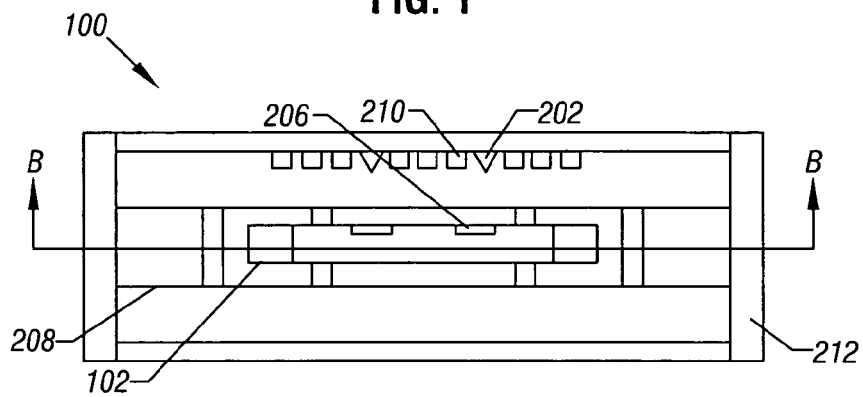
FIGS. 2A and 2B are, respectively, a side view and a top view of a storage module according to an embodiment.
Figure 2B:
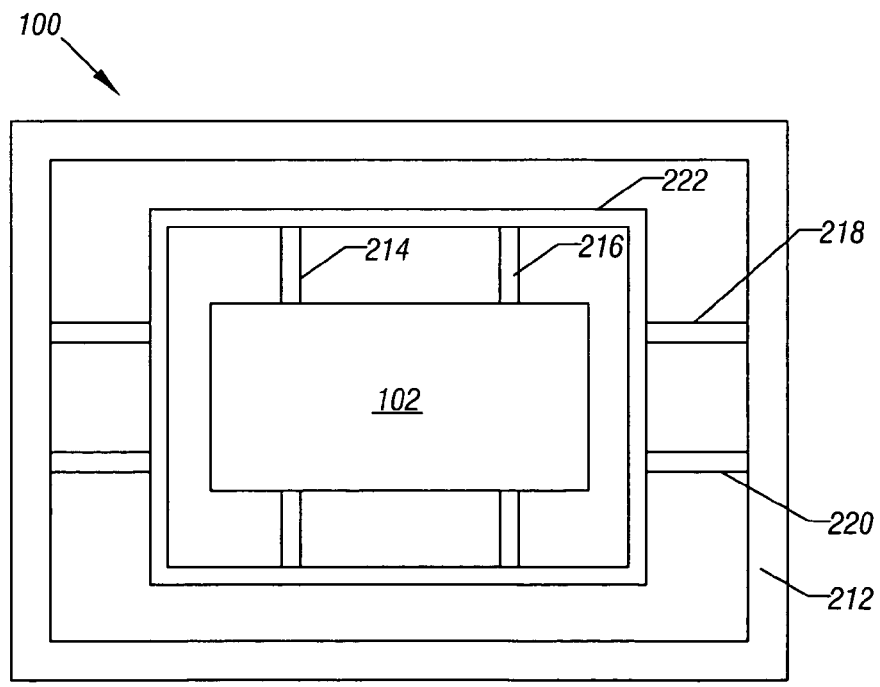

FIGS. 2A and 2B illustrate an example embodiment of the storage module 100 that includes probes having electron field emitters. FIG. 2A depicts a side cross-sectional view of a portion of the storage module 100 that includes a number of electron field emitters 202, the storage medium 102 that incorporates a number of storage regions 206 (such as regions 106, 112, and 114 in FIG. 1), and a micromover 208 that moves the storage medium 102 with respect to the electron field emitters, or vice versa.

During operation, a predetermined potential difference is applied between an electron field emitter 202 and a corresponding gate, such as a gate 210, that surrounds the field emitter. An electron beam current is then extracted from the field emitter 202 toward a storage location on the storage medium 102. The storage medium 102 and field emitters 202 can be contained within a sealed casing 212 that provides at least a partial vacuum.

FIG. 2B is a top view of the section B-B of FIG. 2A. FIG. 2B shows that the storage medium 102 is supported by two sets of micro-fabricated beams (214, 216) and (218, 220), that make up at least a part of a micromover.

Figure 3A:
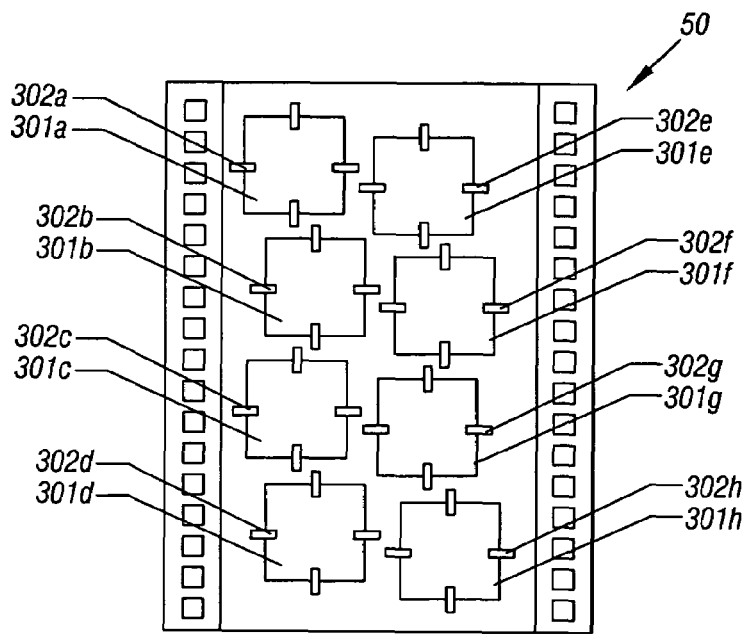
FIGS. 3A-3D are pictorial representations of the manner in which the storage module according to some embodiments may be organized into tracks, patches, and clusters.

FIG. 3A depicts a storage device 50 that includes a number (e.g., eight) of storage modules 301a, 301b, ..., 301g, 301h. Associated with each of the storage modules is a respective micromover 302a, 302b, ..., 302g, 302h.

Figure 3B:
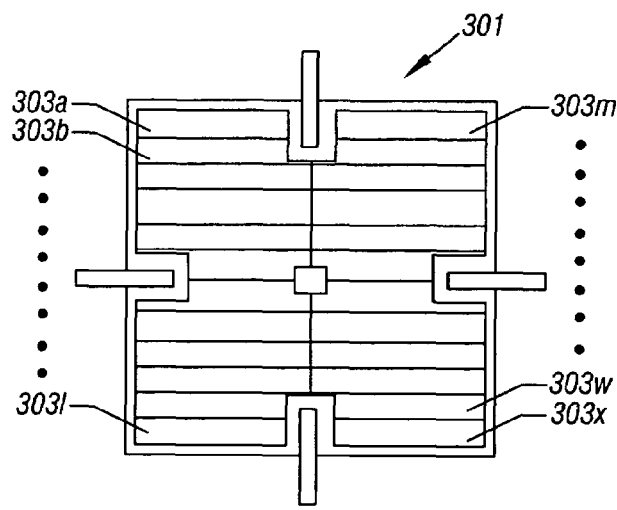

FIGS. 3B-3E depict an example implementation of the hierarchical structure of each storage module. As shown in FIG. 3B, each storage module 301 includes a predetermined number of data clusters 303a, 303b, and so forth. In one implementation, each storage module 301 includes twenty-four (24) data clusters 303a, 303b, ..., 303x.

Figure 3C:
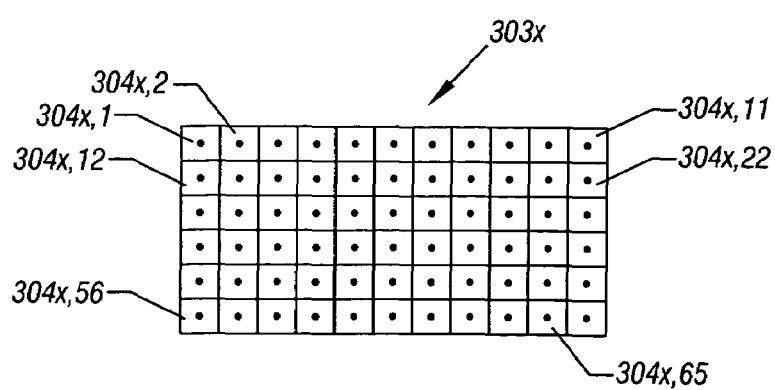

Each of the data clusters, in turn, includes a plurality of patches 304 (FIG. 3C). In one example implementation, each data cluster may include 65 patches arranged as a matrix of six rows by eleven columns. The 65 patches of cluster 303x depicted in FIG. 3C include patches labeled $304_{x,1}$, $304_{x,2}$, ..., $304_{x,11}$, $304_{x,12}$, ..., $304_{x,65}$. The patches can be "data patches" and "spare patches." The large majority of the patches of each cluster are data patches for storing data. A spare patch is a patch for storing data associated with a defective patch. In one example implementation, each cluster includes 58 data patches (e.g., $504_{x,1}$, ..., $504_{x,58}$) and seven spare patches (e.g., $504_{x,59}$, ..., $504_{x,65}$).

A storage module also includes multiple read/write channels, with each cluster corresponding to a particular read/write channel. Each read/write channel is associated with a respective set of a read circuit and a write circuit. To enable selective communication between a read/write circuit and the plural patches of each cluster, a multiplexer and demultiplexer are used. The demultiplexer routes a write signal from a write circuit to a selected one of the plural patches. The multiplexer routes a readback signal from a selected one of the patches to the read circuit.

Figure 3D:
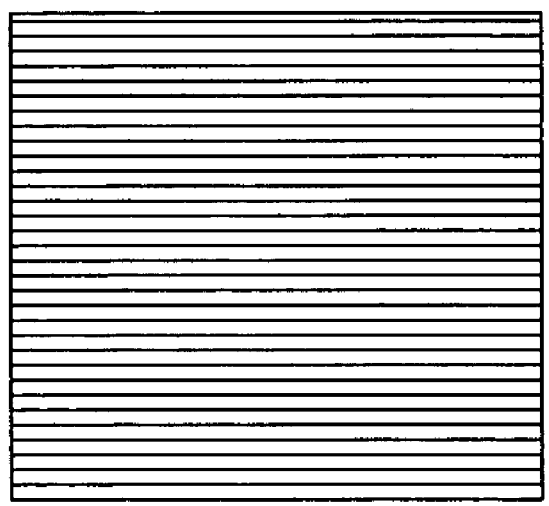

Each of the patches 304 illustrated in FIG. 3C includes a plurality of tracks that extend horizontally across a patch, as illustrated in FIG. 3D. In one example implementation, each patch may include 1,417 tracks. In other implementations, a patch can include a different number of tracks.

Each track includes multiple storage locations (or storage cells), with each storage location containing one unit (or bit) of data. In one embodiment, each storage location may store binary data that assumes either a logic "1" or a logic "0" state. However, alternatively, the storage locations may store other forms of data.

In accordance with some embodiments, each track (of a data patch or spare patch) contains header information that enables a storage module to determine whether the track is defective. The header information of a defective track also contains additional information that identifies a track in a spare patch for the defective track. A track in a spare patch is referred to as a "spare track." Data that is initially written to a defective track of a data patch is replicated in the corresponding track of a spare patch in the same cluster. During a read operation, instead of reading from a defective track, the storage module reads from the corresponding spare track.

To enhance storage access speeds according to some embodiments, the header information of each track also contains "look-ahead" information identifying whether a next data track is defective. A "next data track" refers to the data track that is to be accessed subsequent to the access of the current track. By providing information regarding whether the next data track is defective, a controller associated with the storage module can determine, prior to access of the next data track, whether the next data track or a spare track is to be accessed. If the header information indicates that the next data track is defective, then the "look-ahead" header information also identifies the corresponding spare track for the defective next data track. Effectively, the header information regarding whether a next data track is defective provides look-ahead information that can be used to avoid the overhead associated with accessing a defective data track, determining that the data track is defective, and then accessing a corresponding spare track. The look-ahead header information enables the controller associated with the storage module to determine in advance whether the next track is defective, and if so, to proceed directly to the corresponding spare track instead of having to waste time in first accessing a defective data track. The mechanism to look ahead to determine whether a next data track is defective and to identify a spare track corresponding to the defective next data track is referred to as a look-ahead sparing mechanism. By using the look-ahead sparing mechanism, the presence of defective tracks in a sequence of tracks being accessed does not slow down the data access operation.

In performing look-ahead sparing, the controller associated with the storage module sends an access request (either a read request or write request) to the storage module, where the access request contains an identifier of a first track (note that the first track can either be a data track or spare track). Header information of the first track is read and sent to the controller. The controller determines, from the header information of the first track, whether the next data track (the "second track") is defective. If so, the controller determines an identifier of a spare track corresponding to the second track. The controller then sends the next access request to the storage module, with the next access request containing the identifier of the spare track instead of the identifier of the second track.

The look-ahead sparing mechanism enables a probe to be positioned in a manner that preserves, or enhances, read/write access time in a storage module. The information is stored in the tracks themselves, which enables more efficient storage access operations. In some embodiments, each track contains header information to identify whether one other track is defective. However, in other embodiments, the header information of each track can identify whether multiple other tracks are defective.

Figure 4A:
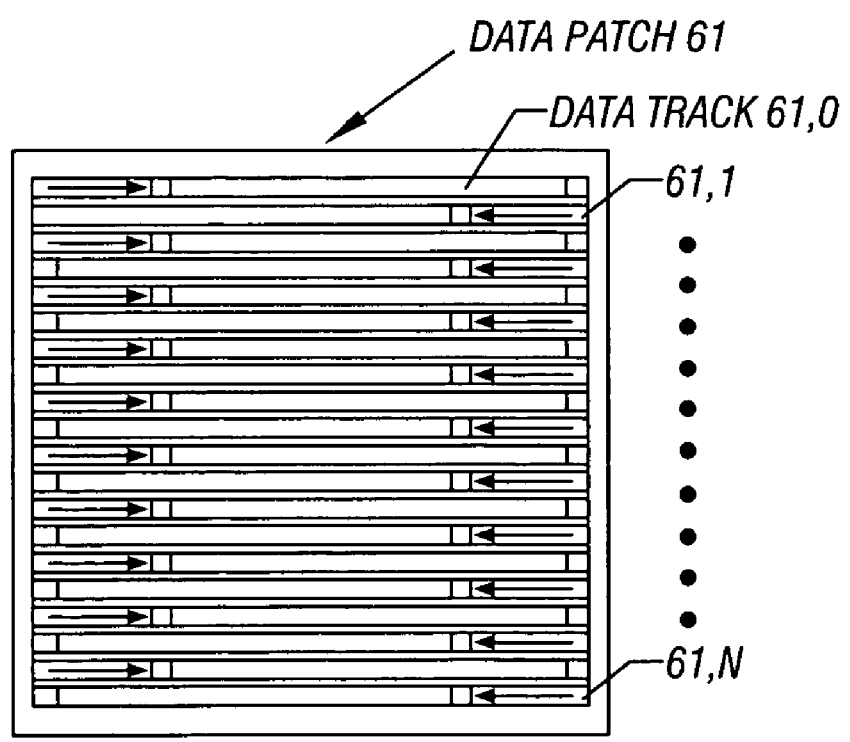
FIG. 4A illustrates an arrangement of tracks in a patch of the storage module.

FIG. 4A illustrates an arrangement of data tracks of a data patch 61. The data patch 61 includes tracks 61,0; ...; 61,N, where N may, in one example, be equal to 1,416. From FIG. 4A, for example, it may be seen that data tracks in a patch that are organized in vertically adjacent tracks are scanned in opposite directions. Thus, track 61,0 is scanned left-to-right across FIG. 4A, while track 61,1 is scanned, oppositely, right-to-left.

Figure 4B:
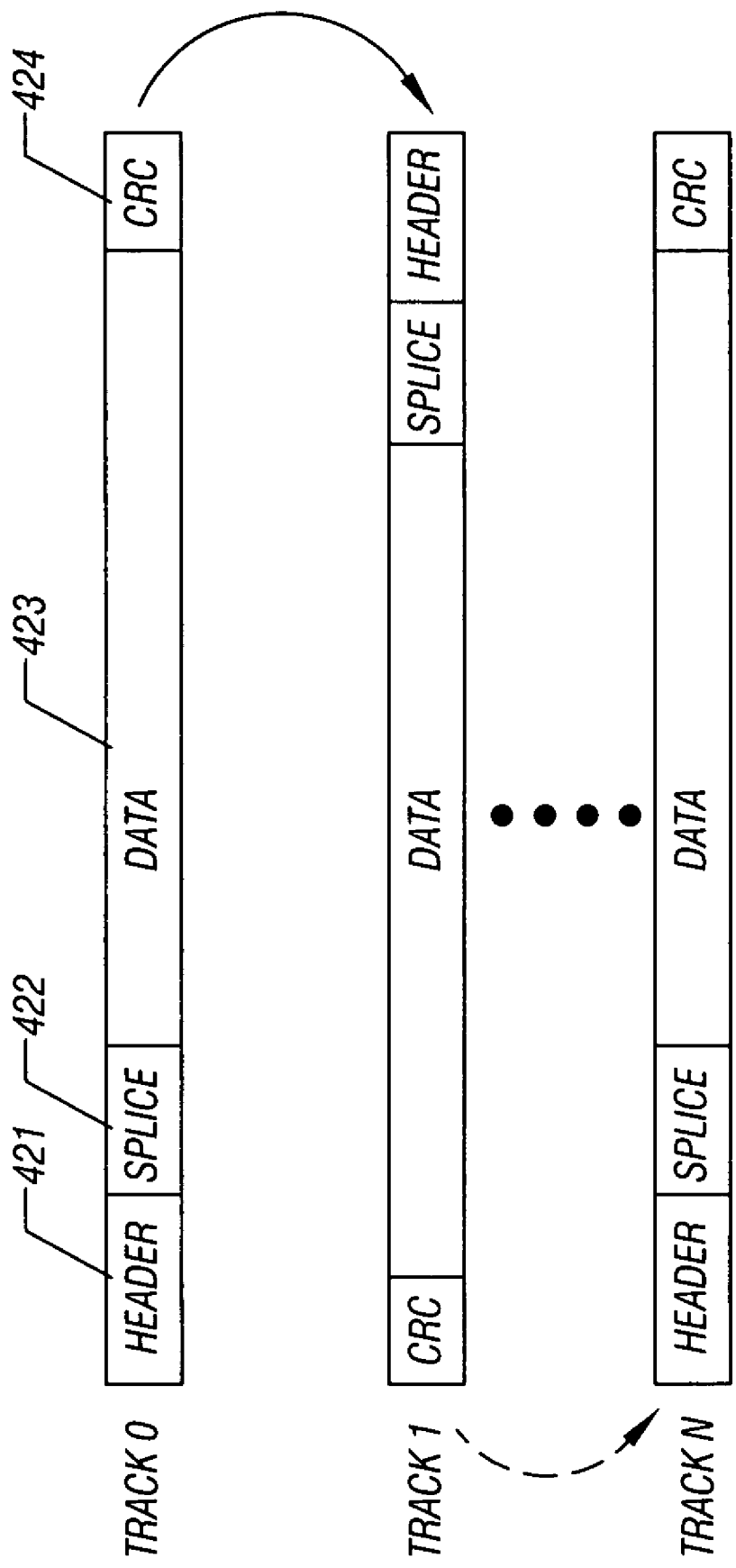
FIG. 4B illustrates contents of several of the tracks of FIG. 4A.

FIG. 4B illustrates the information contained in each track. The track information includes a header portion 421, a write splice portion 422, a data portion 423, and a CRC (cyclic redundancy code) portion 424. The header portion 421 contains various header information, including the header information discussed above that includes (1) information identifying whether a current data track is defective, (2) the location identifier for the corresponding spare track for the current data track, (3) information identifying whether a next data track is defective, and (4) the location identifier for the spare track corresponding to the next data track. The splice portion 422 serves as a buffer area between the header portion 421 and the data portion 423. Data portion 423 is the portion of the track where data is written. The CRC portion 424 contains a value that is used to verify the integrity of data contained in the data portion 423.

Figure 4C:
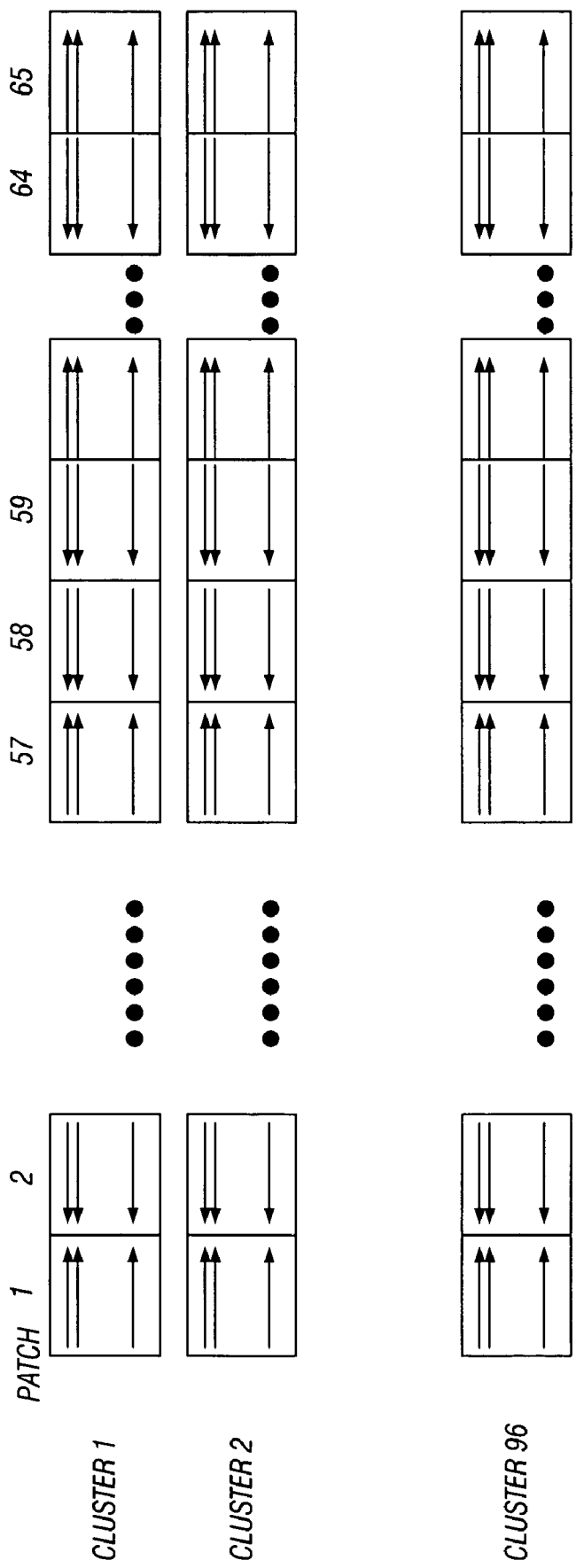
FIG. 4C depicts a manner in which a number of patches are traversed, in accordance with an example embodiment.

In FIG. 4C, patches of a cluster are numbered in sequence, horizontally, while clusters are numbered in sequence, vertically. The combination of a track number, a patch number, and a cluster number represents a unique identifier (referred to as "Track_ID") of a particular track. For example, Track_ID=(261, 57, 18) identifies track 261, in patch 57, of cluster 18. Note that FIG. 4C depicts the logical, rather than physical, arrangement of storage areas. Tracks [(261, 1, 1), (261, 1, 2), ..., (261, 1, 96)] are scanned simultaneously by respective probes. However, tracks [(261, 1, 1), (261, 2, 1), ..., (261, 65, 1)] are logically concatenated to form a complete track.

In one example sequential read operation, the following sequence of tracks is accessed:

[1, 1, 1] [1, 2, 1] [1, 3, 1] ... [1, 58, 1]
[2, 1, 1] [2, 2, 1] [2, 3, 1] ... [2, 58, 1]
[3, 1, 1] [3, 2, 1] [3, 3, 1] ... [3, 58, 1]

In the sequence above, the read operation first accesses track [1, 1, 1], which is track 1 in patch 1 of cluster 1. The next track accessed is track [1, 2, 1], which is track 1 in patch 2 of cluster 1. This sequence continues until track 1 in patch 58 of cluster 1, [1, 58, 1] is accessed. The next track accessed is track [2, 1, 1], which is track 2 in patch 1 of cluster 1. The sequential access continues until [3, 58, 1]. Note that the last track [3, 58, 1] is provided for the purpose of example only, as the read operation can continue to further tracks if desired. Also, the starting track can be different from [1, 1, 1].

The above sequence assumes that none of data tracks in the sequence is located in a defective patch. However, if one of the tracks is defective, then the sequential access will be different. For example, assume data track [1, 2, 1] is defective. In this scenario, the read operation proceeds in the following sequence:

[1, 1, 1] [1, 59, 1] [1, 3, 1] ... [1, 58, 1]
[2, 1, 1] [2, 2, 1] [2, 3, 1] ... [2, 58, 1]
[3, 1, 1] [3, 2, 1] [3, 3, 1] ... [3, 58, 1]

In this sequence, spare track [1, 59, 1] replaces defective data track [1, 2, 1]. The spare track is located in spare patch 59 of the same cluster (1) as the defective data track [1, 2, 1].

Figure 5:
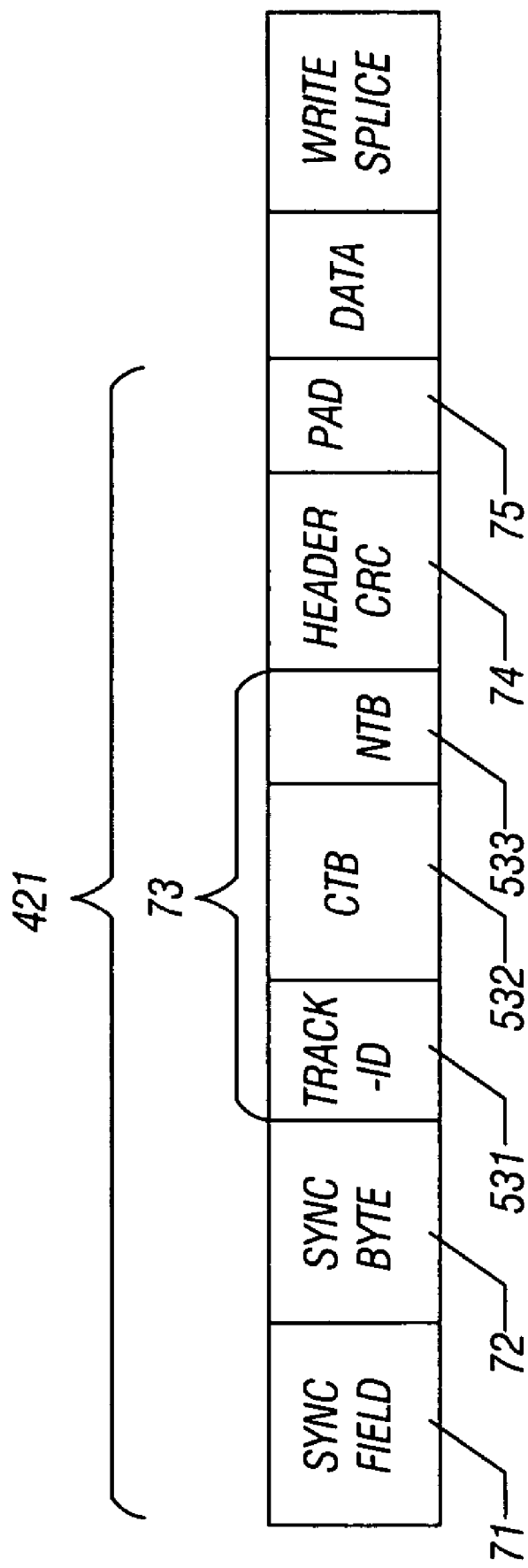
FIG. 5 shows the content of a header in a track that enables a look-ahead sparing technique according to an embodiment.

FIG. 5 depicts in more detail the content of the header portion 421 shown in FIG. 4B, in accordance with some embodiments of the invention. The header portion 421 includes a header address field 73 that contains information used by a look-ahead sparing mechanism according to some embodiments. The header portion 421 also includes information to enable proper operation of a servo system (not shown) that controls the operation of the micromovers of the storage module. Additionally, the header portion 421 includes a sync field 71, sync byte 72, header CRC 74, and a pad 75. The pad 75 serves a purpose similar to that of the write splice 422 (FIG. 4B). Specifically, the pad 75 is positioned at the end of header portion 421 so that, in the event that a write operation has to be performed in the data portion of the track immediately subsequent to reading the header portion 421, adequate time will be afforded to transition from the header reading mode to a data write mode.

The header address field 73 contains, in one implementation, three subfields 531, 532, 533. The Track_ID subfield 531 contains the Track_ID for the track. The CTB (current track bad) subfield 532 contains a value that indicates whether the current track is defective. Further, the CTB subfield 532 also identifies a spare patch that may be used as a substitute for the current defective track. The NTB (next sequential track bad) subfield 533 contains a value that indicates whether the next sequential track is defective. The NTB subfield 533 also identifies a spare patch that is to be used as a substitute for the defective track.

In an access operation (a read operation or a write operation), a probe sequentially scans adjacent tracks. As the probe scans a track, the CTB subfield 532 is read to enable the storage module to determine whether the current track being accessed is defective. If the current track is determined to be defective, the CTB subfield 532 information is further used to locate the spare patch where the correct data may be acquired. In one example implementation, the CTB subfield 532 includes three bits, which can assume hexadecimal values 0h, 1h, ..., 7h. The three CTB bits may be decoded as follows: 0h may indicate that the current track is not defective. Accordingly, any value other than 0h represents that the current track is defective. The non-0h value of the CTB subfield 532 also represents the location of spare track. For example, 3h may indicate that spare information is stored in a third spare patch. If patches within the cluster are allocated to provide 58 data patches and 7 spare patches, then patch 61 is, in this configuration, the third spare patch.

In addition, when scanning a track, the NTB subfield 533 is also accessed to determine whether the next sequential track is defective. If the next sequential tack is indicated to be defective, then the NTB subfield 533 value is used to locate the spare track. For example, in the course of scanning track (3, 2, 1) (track 3 in patch 2 of cluster 1), the NTB subfield 533 is read to determine whether the next track (3, 3, 1) (track 3 in patch 3 of cluster 1) is defective. In another example, in the course of scanning track (100, 2, 1) (track 100 in patch 2 of cluster 1), the NTB subfield 533 is read to determine whether the next track (100, 3, 1) (track 100 in patch 3 of cluster 1) is defective.

In accordance with one embodiment, the CTB and NTB fields may be populated during storage module manufacture. During manufacture of a storage module, testing is performed to discover defects. As defective tracks are detected, correct data is written to spare patches, if necessary, and CTB and NTB data are written to the respective track header portions.

Figure 8:
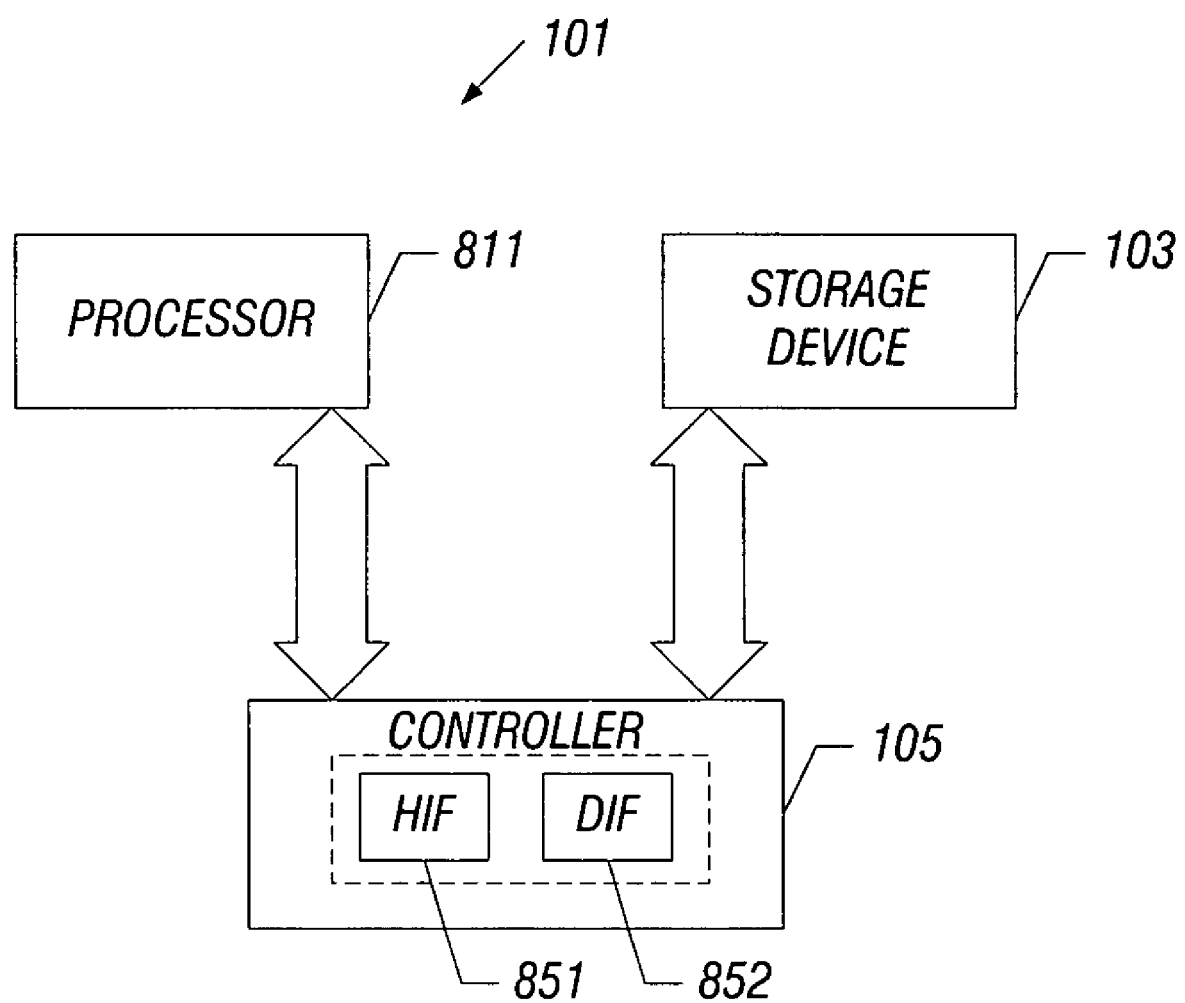
FIG. 8 is a block diagram of an apparatus incorporating a storage device according to an embodiment of the invention.

As shown in FIG. 8, in one embodiment, an example system 101 includes a processor 811 and a storage device 103. The storage device 103 includes one or more of the plural storage modules described above. The processor 811 may communicate with a controller 105 to write data to, and read data from, the storage device 103. In the depicted embodiment, the controller 105 includes a host interface (HIF) 851 and a device interface (DIF) 852. The HIF 851 includes hardware and firmware to interact with the host, which includes the processor 811. The DIF 852 includes the hardware and firmware to manage access to the storage device 103 in response to requests from the host. Although shown as a separate component, the controller 105 can be part of the storage device 103 or part of the processor 811. Alternatively, the DIF 852 can be part of the storage device 103, and the HIF 851 can be part of the processor 811.

Figure 6:
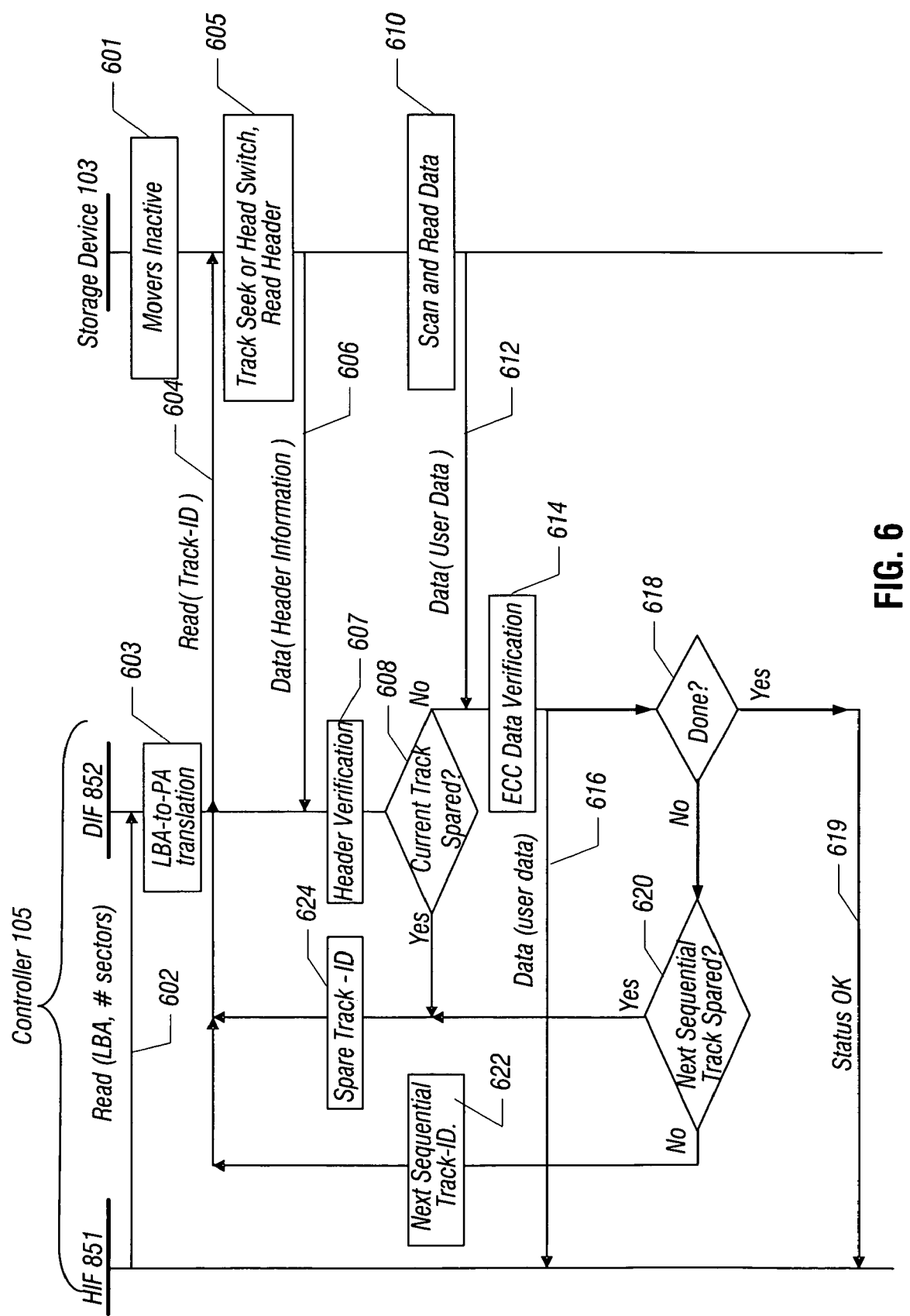
FIG. 6 is a message flow diagram of a read operation in which look-ahead sparing is performed, in accordance with an embodiment.
Figure 7:
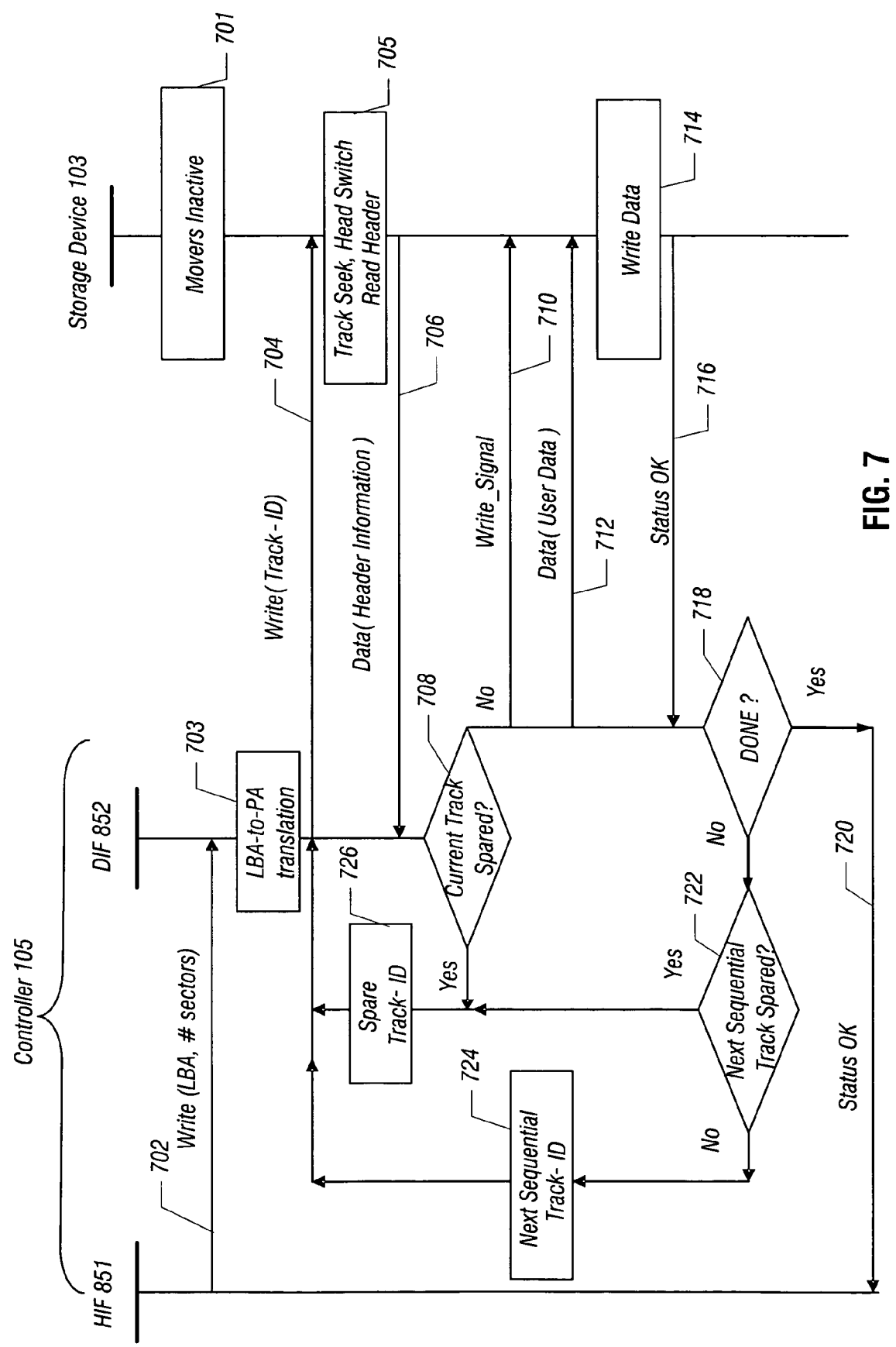
FIG. 7 is a message flow diagram of a write operation in which look-ahead sparing is performed, in accordance with an embodiment.

FIG. 6 and FIG. 7 are message flow diagrams that illustrate, respectively, a process of reading data from and writing data to the storage device 103 in the system 101 (FIG. 8), in accordance with an embodiment.

Referring to FIG. 6, prior to beginning a read sequence, the micromovers of the storage device 103 (FIG. 8) are assumed to be inactive (at 601). Note, however, that an access operation may be active in an alternative scenario. To start a read, the HIF 851 sends (at 602) a read request to the DIF 852. The read request contains a LBA (logical block address) and an indication of the number of sectors to read to the DIF 852. In response, the DIF 852 performs (at 603) an LBA-to-PA (logical block address-to-physical address) translation. Based on the physical address, the DIF 852 sends (at 604) a read request to the storage device. The read request sent at 604 contains the Track_ID of the target track.

In response to the read request containing the Track_ID, the storage device 103 retrieves (at 605) header information stored in the specified track. To access the requested track, the servosystem of the storage device 103 may perform a track seek or head switch (a head switch involves a change from one probe to another probe). A head switch effectively means that the data to be read resides in a data patch other than the data patch that had been most recently accessed. The header information is communicated (at 606) by the storage device 103 to the DIF 852. The storage device 103 proceeds (at 610) to further scan the track (indicated by Track_ID) to read data from the track. The read data is sent (at 612) by the storage device 103 to the DIF 852.

Concurrently, header verification is performed (at 607) by the DIF 852 to determine if the correct data track is being read. Based on the header information, the DIF 852 also determines (at 608) whether the target data track is spared. A track is spared if the track is defective and data has to be retrieved from a spare track. Determining whether the current track is defective is based on the CTB subfield 532 (FIG. 5) of the header portion 421.

If the target data track is defective, as determined at 608, the DIF 852 determines (at 624), from the CTB subfield 532 (FIG. 5) information, the Track_ID for the spare track. The Track_ID for the spare track is included in another read request sent at 604 to read data from the spare track.

If the target data track is not spared (which means that the target data track is not defective), as determined at 608, then the data received at 612 from the storage device is accepted by the DIF 852. The DIF 852 determines (at 614) whether any error is present in the read data. ECC (error corrections code) processing can be applied to perform error detection and correction. After error detection and correction (if applied), the read data is transmitted (at 616) from the DIF 852 to the HIF 851.

Next, the DIF 852 determines (at 618) whether all sequential data accesses requested by the host have been completed. The number of sectors specified in the original read request (at 602) from the HIF 851 is used to indicate the number of tracks that the DIF 852 has to read. If all requested data accesses have been completed (based on a comparison of the number of tracks accessed versus the number of sectors requested in the read request at 602), a success message (e.g., "Status OK") is transmitted (at 619) from the DIF 852 to the host via the HIF 851.

If all accesses have not been completed, as determined at 618, the DIF 852 determines (at 620) if the next sequential track is spared (defective). Note that the determination of whether the next sequential track is defective is based on the NTB subfield 533 (FIG. 5) contained in the header portion 421. The NTB subfield 533 processed is from the header information communicated at 606 from the storage device 103 for the current track being accessed.

If the next sequential track is not defective, then the next sequential Track_ID is determined (at 622), and another read request (containing the next sequential Track_ID) is sent (at 604) to the storage device.

However, if the DIF 852 determines (at 620) from the NTB subfield 533 (FIG. 5) that the next sequential track is defective, then the spare Track_ID for the spare track is derived (at 624), also from the NTB subfield. The spare Track_ID is then sent in a read request (at 604) to the storage device 103 to read the spare track (rather than the corresponding defective data track). Note that the determination of the spare Track_ID from the NTB subfield 533 is part of the look-ahead sparing mechanism that enables the DIF 852 to directly access the spare track without having to first issue a read request to the defective next data track.

FIG. 7 is a message flow diagram that illustrates, in one embodiment, a method for writing data to the storage device 103 according to some embodiments. The micromovers are initially assumed to be inactive (at 701). However, in an alternative scenario, the micromovers may be active in a write operation.

In response to a write operation initiated by the host, the HIF 851 sends (at 702) a write request to the DIF 852. The write request contains a LBA and the number of sectors to write (along with associated write data). The DIF 852 performs (at 703) an LBA-to-PA translation. Next, the DIF 852 sends (at 704) a write request to the storage device 103. The write request sent at 704 includes the Track_ID of the target track to which data is to be written. In response, the storage device 103 performs (at 705) a track seek or head switch, and reads header information from the selected track. The header address information is communicated (at 706) from the storage device 103 to the DIF.

From the header information (and in particular the CTB subfield 532 of FIG. 5), the DIF 852 determines (at 708) whether the accessed track is spared (that is, the accessed track is defective). If the accessed track is defective, then the DIF 852 determines from the CTB subfield 532 the spare Track_ID (identifying the identifier of the spare track corresponding to the defective track currently accessed). The DIF 852 then sends (at 704) another write request that contains the spare Track_ID.

If the track is not spared (not defective), as determined at 708, then the requested write operation is allowed to proceed. A write signal (or write signals) is (are) sent (at 710) to the storage device 103, along with the write data (at 712). In response, the storage device 103 writes (at 714) the data to the identified track. Subsequent to the write operation, the storage device 103 transmits (at 716) a success message (e.g., "Status OK") to the DIF 852.

Next, the DIF 852 determines (at 718) if all of the requested data has been written (based on a comparison of the number of tracks accessed versus the number of sectors requested in the write request at 702). If so, the DIF 852 sends (at 720) a success message (e.g., "Status OK") to the HIF 851. However, if not all data has been written, the DIF 852 determines (at 722) if the next sequential track is spared (defective). The determination made at 722 is part of the look-ahead sparing mechanism to look ahead, based on the NTB subfield 533 (FIG. 5) of the current track just accessed, to the next track so that a defective track can be identified. If the next track is not spared, then the next sequential Track_ID is determined (at 724) by the DIF 852. Next, the DIF 852 sends another write request (at 704) that contains the next sequential Track_ID to the storage device 103 to perform the next write operation.

However, if the next sequential track is determined at 722 to be defective, then the DIF 852 determines (at 726) the spare Track_ID to identify the spare track corresponding to the next sequential track. The spare Track_ID is then provided in a write request (at 704) to the storage device 103 to perform a write to the spare track.

The tasks described above with respect to the HIF 851, DIF 852, and storage device 103 can be performed by hardware, firmware, or software, or a combination of any of the above. Any software is in the form of instructions that are stored on one or more storage media. The instructions can be loaded for execution on corresponding control units or processors. The control units or processors include microprocessors, microcontrollers, processor modules or subsystems (including one or more microprocessors or microcontrollers), or other control or computing devices. As used here, a "controller" refers to hardware, firmware, software, or a combination thereof. A "controller" can refer to a single component or to plural components (whether software, firmware, or hardware).

Data and instructions (of the software) are stored in one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); atomic resolution storage devices; and so forth.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising:
   a storage medium; and
   a probe to read from and write to the storage medium,
   wherein the storage medium has a plurality of storage regions, each storage region containing information to identify whether another storage region is defective,
   wherein each storage region contains information to identify a spare storage region for another storage region that is defective.

2. The storage device of claim 1, wherein each storage region further contains information to identify whether said each storage region is defective.

3. The storage device of claim 2, wherein each storage region further contains information to identify a spare storage region for said each storage region that is defective.

4. A storage device comprising:
   a storage medium; and
   a probe to read from and write to the storage medium,
   wherein the storage medium has a plurality of storage regions, each storage region containing information to identify whether another storage region is defective,
   wherein the storage regions comprise tracks, the storage medium further having patches, each patch including a plurality of tracks,
   wherein a first track in a first patch includes header information, the header information having a first field containing information to identify whether a second track in a second patch is defective.

5. The storage device of claim 4, wherein the first field also identifies a third track in a spare patch corresponding to the second track.

6. The storage device of claim 5, wherein the header information of the first track further includes a second field containing information to identify whether the first track is defective.

7. The storage device of claim 6, wherein the second field further identifies a location of a fourth track in a spare patch corresponding to the first track.

8. The storage device of claim 4, wherein each of the tracks contains header information to identify if another track is defective, each track further including a data portion to store data.

9. The storage device of claim 1, further comprising:
   a micromover to move the storage medium with respect to the probe.

10. A method of storing data in an atomic resolution storage device, comprising:
    writing data, using probes, into plural tracks in the storage device;
    storing header information in each track, the header information of each track to identify if another track is defective; and
    during access of a first track, reading the header information of the first track to determine if a second track is defective.

11. The method of claim 10, further comprising:
    in response to detecting from the header information of the first track that the second track is defective, accessing a spare track instead of the second track.

12. The method of claim 11, further comprising:
    performing an access of sequence of tracks, wherein the second track follows the first track in the sequence,
    wherein determining that the second track is defective using the header information in the first track enables look-ahead identification of whether the second track is defective prior to accessing the second track.

13. The method of claim 10, further comprising:
    during access of the first track, reading the header information of the first track to determine if the first track is defective.

14. The method of claim 13, further comprising:
    in response to determining that the first track is defective, determining an identifier of a spare patch corresponding to the first track; and
    accessing the spare patch based on the determined identifier.

15. The method of claim 14, further comprising:
    in response to determining that the second track is defective, determining an identifier of a second spare patch corresponding to the second track; and
    accessing the second spare track instead of the second track.

16. A system comprising:
    a processor;
    a storage device coupled to the processor, the storage device comprising:
       a storage medium, and
       a probe to write to and read from the storage medium,
       the storage medium having a plurality of storage regions, each storage region having header information including a first field to indicate whether a next storage region is defective and a second field to identify a spare storage region corresponding to the next storage region.

17. The system of claim 16, further comprising a controller, the controller adapted to:
    send an access request to the storage device, the access request containing an identifier of a first storage region;
    in response to the access request, receive header information of the first storage region;
    determine, based on the received header information, whether a second storage region is defective; and
    determine, based on the received header information, a location of a spare storage region for the defective second storage region.

18. The system of claim 17, wherein the controller is adapted to further:

in response to determining that the second storage region is defective, send a second access request containing an identifier of the spare storage region for the second storage region, instead of an identifier of the second storage region.

19. The system of claim 18, wherein the controller comprises a host interface to interact with the processor, and a device interface to interact with the storage device.

20. The system of claim 16, wherein the probe comprises a nanotechnology contact-based probe.

21. The system of claim 16, wherein the probe comprises an electron field emitter.

22. A computer-readable storage medium stored thereon executable instructions that when executed cause a controller to:

send an access request to a storage device having a storage medium with plural storage regions, each storage region having header information, the storage device further having a nanotechnology probe to read from and write to the storage medium;

receive header information of a first storage region in response to the access request;

determine, based on the header information of the first storage region, whether a next storage region following the first storage region is defective; and determine, based on the header information of the first storage region, an identifier of a spare storage region for the next storage region that is defective.

23. The computer-readable storage medium of claim 22, wherein the instructions when executed cause the controller to further:

in response to determining that the next storage region is defective, send a second access request to the storage device, the second access request containing the identifier of the spare storage region instead of an identifier of the next storage region.

* * * * *

UNITED STATES PATENT AND TRADEMARK OFFICE
CERTIFICATE OF CORRECTION

| | |
|---|---|
| PATENT NO. | : 7,471,615 B2 |
| APPLICATION NO. | : 10/903175 |
| DATED | : December 30, 2008 |
| INVENTOR(S) | : Robert G. Mejia et al. |

It is certified that error appears in the above-identified patent and that said Letters Patent is hereby corrected as shown below:

In column 10, line 23, in Claim 12, after "access of" insert -- a --.

In column 10, line 61, in Claim 17, after "request" delete "." and insert -- , --, therefor.

Signed and Sealed this

Fourteenth Day of April, 2009

JOHN DOLL
*Acting Director of the United States Patent and Trademark Office*